(12) United States Patent
Kuhne et al.

(10) Patent No.: US 8,439,643 B2
(45) Date of Patent: May 14, 2013

(54) BIFORMAL PLATFORM TURBINE BLADE

(75) Inventors: Craig Miller Kuhne, Cincinnati, OH (US); Joseph Steven Bubnick, Cincinnati, OH (US); Alisha Vachhani Kalb, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 740 days.

(21) Appl. No.: 12/544,327

(22) Filed: Aug. 20, 2009

(65) Prior Publication Data
US 2011/0044818 A1    Feb. 24, 2011

(51) Int. Cl.
*F01D 5/30* (2006.01)

(52) U.S. Cl.
USPC ...................... 416/193 A; 416/228

(58) Field of Classification Search ........... 415/914; 416/97 R, 193 A, 235, 236 R, 239
See application file for complete search history.

(56) References Cited

U.S. PATENT DOCUMENTS

| | | | |
|---|---|---|---|
| 3,986,793 A | 10/1976 | Warner et al. | |
| 5,017,091 A | 5/1991 | Tran | |
| 5,067,876 A | 11/1991 | Moreman | |
| 5,222,865 A | 6/1993 | Corsmeier | |
| 5,397,215 A | 3/1995 | Spear et al. | |
| 5,509,784 A | 4/1996 | Caruso et al. | |
| 6,017,186 A | 1/2000 | Hoeger et al. | |
| 6,283,713 B1 | 9/2001 | Harvey et al. | |
| 6,419,446 B1 | 7/2002 | Kvasnak et al. | |
| 6,511,294 B1 | 1/2003 | Mielke et al. | |
| 6,524,070 B1 * | 2/2003 | Carter ....................... | 416/193 A |
| 6,561,761 B1 | 5/2003 | Decker et al. | |
| 6,579,061 B1 | 6/2003 | Heyward et al. | |
| 6,669,445 B2 | 12/2003 | Staubach et al. | |
| 6,672,832 B2 | 1/2004 | Leeke et al. | |
| 6,682,306 B2 | 1/2004 | Murakami et al. | |
| 6,837,679 B2 | 1/2005 | Kawarada et al. | |
| 7,134,842 B2 * | 11/2006 | Tam et al. ................. | 416/193 A |
| 7,217,096 B2 | 5/2007 | Lee | |
| 7,220,100 B2 | 5/2007 | Lee et al. | |
| 7,249,933 B2 | 7/2007 | Lee et al. | |
| 7,354,243 B2 * | 4/2008 | Harvey ........................ | 415/191 |
| 8,177,499 B2 * | 5/2012 | Iida ............................ | 415/208.1 |
| 2007/0258810 A1 | 11/2007 | Aotsuka et al. | |
| 2007/0258818 A1 | 11/2007 | Allen-Bradley et al. | |
| 2008/0118363 A1 * | 5/2008 | Lee et al. ...................... | 416/232 |
| 2009/0053066 A1 | 2/2009 | Iida | |

FOREIGN PATENT DOCUMENTS

| | | |
|---|---|---|
| EP | 1681438 A2 | 7/2006 |
| WO | 2009112776 A2 | 9/2009 |
| WO | 2010074930 A1 | 7/2010 |

OTHER PUBLICATIONS

U.S. Appl. No. 12/238,785, filed Sep. 26, 2008, K. Kirtley et al.
U.S. Appl. No. 12/330,783, filed Dec. 9, 2008, V.S. Pandey et al. U.S. Appl. No. 12/344,058, filed Dec. 24, 2008, V.S. Pandey et al.
U.S. Appl. No. 12/472,611, filed May 27, 2009, C.M. Kuhne et al.
Harvey et al, "Non-Axisymmetric Turbine End Wall Design: Part I Three-Dimensional Linear Design System," ASME 99-GT-337, Jun. 1999, pp. 1-9.
PCT Search Report and Written Opinion issued Jul. 6, 2011 in connection with corresponding Application No. PCT/US2010/038630.

\* cited by examiner

*Primary Examiner* — Nathaniel Wiehe
*Assistant Examiner* — Woody A Lee, Jr.
(74) *Attorney, Agent, or Firm* — General Electric Company; David J. Clement; Matthew P. Hayden

(57) ABSTRACT

A turbine blade includes an airfoil and integral platform. The platform is biformally contoured in elevation to include bilaterally disposed elevated ridges and depressed troughs on opposite sides of the airfoil.

19 Claims, 4 Drawing Sheets

BIFORMAL PLATFORM TURBINE BLADE

BACKGROUND OF THE INVENTION

The present invention relates generally to gas turbine engines, and, more specifically, to turbines therein.

In a gas turbine engine, air is pressurized in a compressor and mixed with fuel in a combustor for generating hot combustion gases. Energy is extracted from the gases in turbine stages which power the compressor and a shaft that typically drives a fan in an aircraft turbofan engine application.

A high pressure turbine (HPT) directly follows the combustor and receives the hottest gases therefrom from which energy is initially extracted. A low pressure turbine (LPT) follows the HPT and extracts additional energy from the gases.

As energy is extracted from the gases in the various turbine stages, the velocity and pressure distributions correspondingly vary, which in turn requires correspondingly different aerodynamic profiles of the turbine stator vanes and rotor blades. The size of the vanes and blades typically increases in the downstream direction for providing more surface area to extract energy from the combustion gases as the pressure thereof decreases.

The velocity of the gases also decreases as energy is extracted and the flowpath area increases, which in turn leads to changes in the span and thickness aspect ratios of the vanes and blades and corresponding camber thereof.

Fundamental to turbine efficiency is the aerodynamic performance of the individual turbine airfoils as the combustion gases are split along the leading edges thereof for corresponding flow along the generally concave pressure side of the airfoil and the generally convex suction side thereof. Differential pressure is effected between the opposite airfoil sides, and aerodynamic contour or camber of the airfoil is optimized for maximizing differential pressure without undesirable flow separation of the gases over the suction side.

The turbine flowpath is defined circumferentially between adjacent airfoils as well as radially between inner and outer flowpath surfaces. For the turbine nozzle, inner and outer bands integral with the vanes bound the flow. And for the turbine blades, radially inner platforms and radially outer shrouds bound the combustion gases.

A particular problem affecting turbine efficiency is the generation of undesirable vortices as the combustion gases are split along the airfoil leading edges near a flow boundary, such as the radially inner blade platforms. Two horseshoe vortices flow downstream on opposite sides of each airfoil and create undesirable turbulence in the flow. This turbulence can increase platform heating. And, migration of the vortices radially outwardly can decrease turbine efficiency.

The outer and inner flowpath boundaries in the typical gas turbine engine may vary in contour or axial profile, but are axisymmetrical with constant diameter or radius from the axial centerline axis of the engine at each axial plane. The blade platforms, for example, are therefore axisymmetric with uniform circumferential curvature from their upstream forward ends to their downstream aft ends notwithstanding any axial inclination or slope thereof.

In previous turbine developments, it is known to selectively contour the flowpath boundaries to minimize the adverse affects of the horseshoe vortices. However, due to the complex three dimensional (3D) configuration of the turbine stages and the correspondingly complex 3D distributions of the velocity, pressure, and temperature of the combustion gases contouring of the flowpath boundaries is equally complex and is directly affected by the specific design of the specific turbine stage.

Accordingly, known flowpath contouring is highly specific to specific turbine stages and is not readily transferable to different stages whose efficiency and performance could instead be degraded.

Adding to the complexity of design and environment are the special flow fields around the radially outer tips of the turbine blades which rotate at high speed inside a surrounding stationary shroud during operation. Combustion gases which leak over the airfoil tips in the required clearance between the tips and shroud perform little, if any, useful work.

Modern turbine blade design typically incorporates squealer tip ribs which are small radial extensions of the pressure and suction sides of the airfoil from leading to trailing edge. The tip ribs are typically rectangular in cross section and spaced transversely or circumferentially apart to define an open tip cavity atop the airfoil which has an integral tip floor that encloses the typically hollow airfoil and the internal cooling circuit therein.

The small tip ribs provide sacrificial material in the event of a tip rub to protect the tip floor and internal cooling circuit from undesirable damage. The tip ribs increase the complexity of the combustion gas flow field introducing local secondary fields which affect turbine efficiency, flow leakage, and tip cooling.

The primary flow direction of the combustion gases is in the axially downstream direction in the flow passages defined between adjacent blades. The axial flow stream also varies along the radial direction from root to tip of each airfoil, and is significantly affected by the horseshoe vortices. And, these axial and radial flow variations are further compounded over the airfoil tip where the combustion gases leak between the pressure and suction sides of each airfoil.

Accordingly, it is desired to provide a turbine rotor blade having an improved configuration for improving turbine performance and efficiency.

BRIEF DESCRIPTION OF THE INVENTION

A turbine blade includes an airfoil and integral platform. The platform is biformally contoured in elevation to include bilaterally disposed elevated ridges and depressed troughs on opposite sides of the airfoil.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
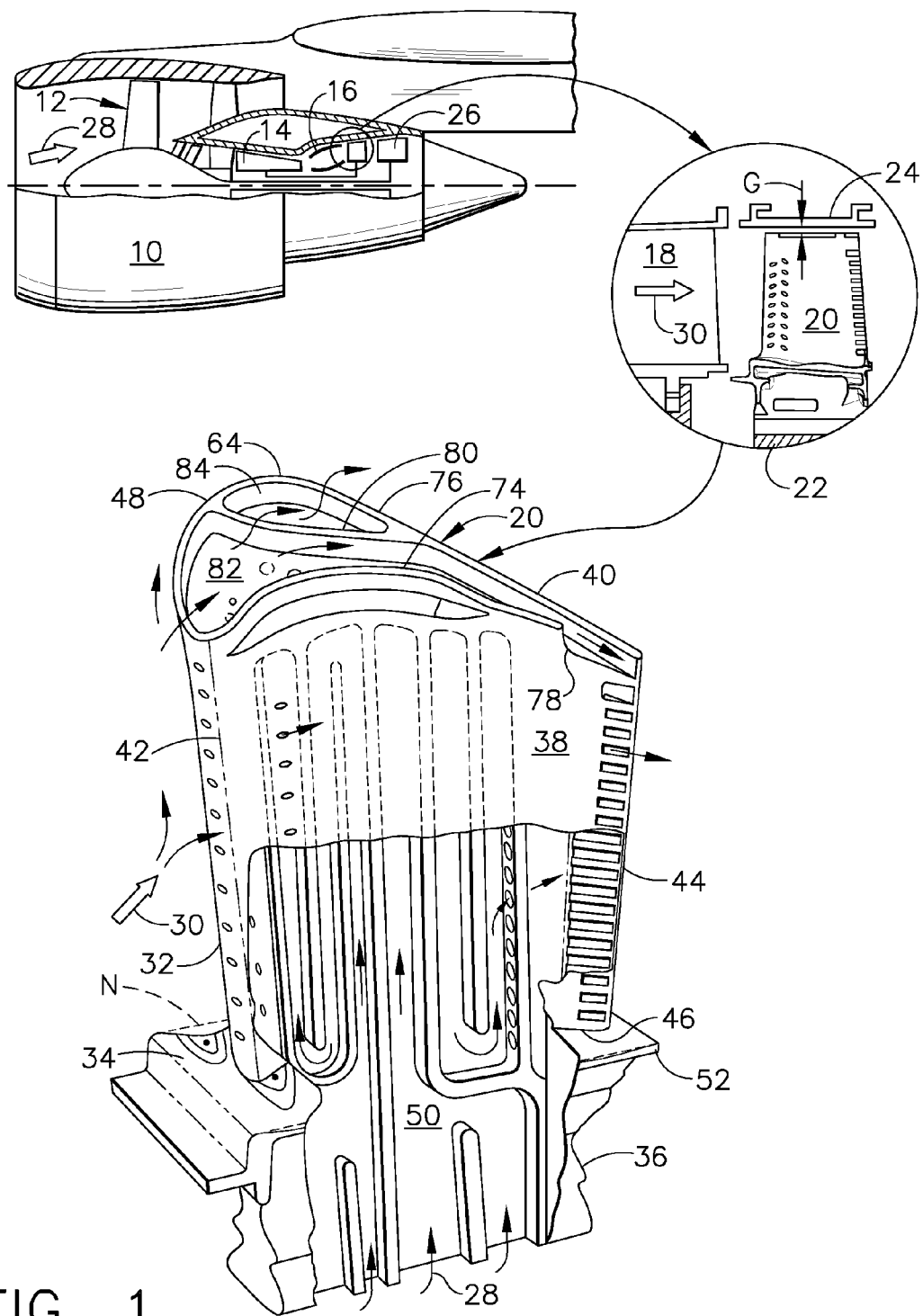
FIG. 1 is a schematic view of an exemplary turbofan gas turbine aircraft engine including a single-stage HPT having a row of turbine rotor blades.

Illustrated schematically in FIG. 1 is an exemplary turbofan gas turbine engine 10 mounted to an aircraft wing (shown in part) for powering an aircraft in flight.

The engine 10 is axisymmetrical about a longitudinal or axial centerline axis, and includes in serial flow communication a fan 12, compressor 14, and combustor 16 followed by a single-stage HPT. The HPT includes a nozzle 18 and a row of first stage turbine rotor blades 20 extending radially outwardly from a supporting rotor disk 22.

The row of blades 20 is mounted inside a surrounding turbine shroud 24 with a small radial clearance or tip gap G therebetween. And, a multistage LPT 26 follows the single stage HPT.

During operation, air 28 enters the engine and is pressurized in the compressor and mixed with fuel in the combustor. Hot combustion gases 30 then leave the combustor to power the HPT and LPT which in turn power the compressor and fan.

The exemplary turbine blade 20 is typically cast from superalloy metal with an airfoil 32, platform 34 at the root thereof, and a supporting dovetail 36 in an integral, one-piece assembly.

The dovetail 36 may have any conventional form, such as the axial-entry dovetail illustrated, which mounts the blade in a corresponding dovetail slot in the perimeter of the supporting rotor disk 22. The disk 22 holds a full row of the blades spaced circumferentially apart from each other to define inter-blade flow passages therebetween.

During operation, the combustion gases 30 are discharged from the combustor 16 downstream through the nozzle 18 and between the corresponding blades 20 which extract energy therefrom for powering the supporting rotor disk. The individual platform 34 provides a radially inner boundary for the combustion gases and adjoins adjacent platforms in the full row of turbine blades.

Figure 2:
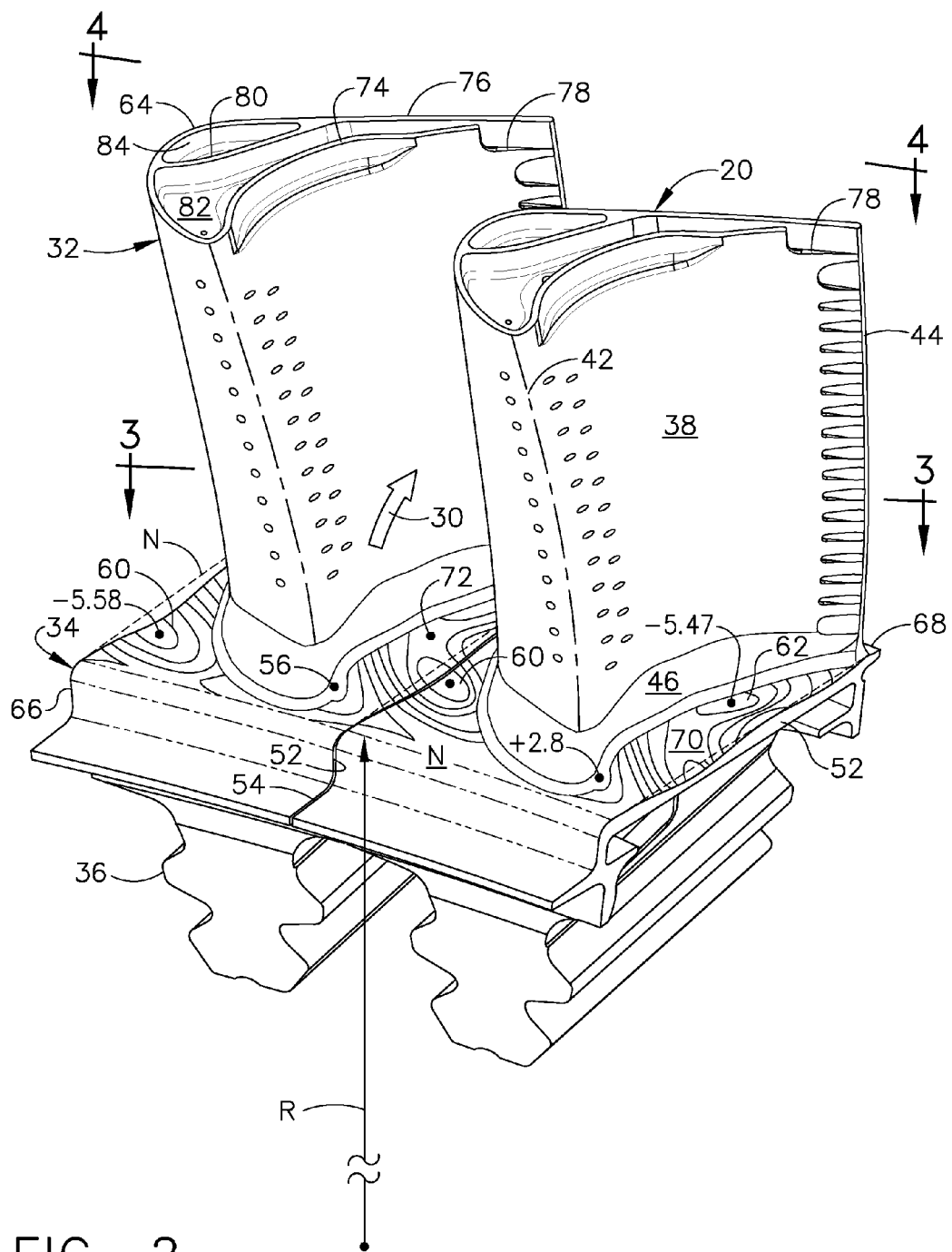
FIG. 2 is an isometric view of two HPT blades illustrated in FIG. 1 having biformally contoured platforms for improving flow of the combustion gases thereover.

The airfoils 32 illustrated in FIGS. 1 and 2 include circumferentially or transversely opposite pressure and suction sides 38,40 extending axially in chord between opposite leading and trailing edges 42,44 and extend radially in span from the airfoil root 46 to terminate in a radially outer tip cap, or tip, 48. The airfoil pressure side 38 is generally concave between the leading and trailing edges and complements the generally convex airfoil suction side 40 between the leading and trailing edges.

The external surfaces of the pressure and suction sides 38,40 of the airfoil have the typical crescent shape or profile conventionally configured for effecting corresponding velocity and pressure distributions of the combustion gases thereover during operation for maximizing energy extraction from the gases.

The airfoil 32 is typically hollow and includes an internal cooling circuit 50 which may have any conventional configuration, such as the illustrated two three-pass serpentine circuits that terminate in corresponding impingement flow passages behind the leading edge and in front of the trailing edge. The cooling circuit extends through the platform and dovetail with corresponding inlets in the base of the dovetail for receiving pressurized cooling air 28 from the compressor 14 in any conventional manner.

In this way, the blade is internally cooled from root to tip and between the leading and trailing edges by the internal cooling air 28 which then may be discharged through the thin airfoil sidewalls in various rows of film cooling holes of conventional size and configuration.

Since the leading edge of the airfoil is typically subject to the hottest incoming combustion gases, dedicated cooling thereof is provided in any suitable manner. And, the thin trailing edge region of the airfoil typically includes a row of pressure side trailing edge cooling slots for discharging a portion of the spent cooling air.

As described above, the turbine airfoils 32 shown in FIG. 2 have precisely configured 3D external profiles which correspondingly affect the velocity and pressure distributions of the combustion gases 30 as they flow in the axial downstream direction from leading to trailing edges 42,44 and between the root and tip. The blades are attached to the perimeter of the supporting disk and rotate during operation, which generates secondary flow fields in the combustion gases with radial migration of the combustion-gases along the span of the airfoil.

Furthermore, the relative pressure of the combustion gases on the pressure side 38 of the airfoil is higher than the pressure along the suction side 40 of the airfoil, and along with the corresponding rotation of the blade during operation introduces further secondary or tertiary affects in the combustion gas flow field as it flows radially up and over the exposed airfoil tip 48 during operation.

The turbine rotor blade 20 described above may be conventional in configuration and operation for use in a gas turbine engine, including for example the first stage of the HPT. The otherwise conventional blade may then be specifically modified as described hereinbelow for improving performance thereof, especially in new or derivative turbofan engines.

As disclosed above in the Background section, the combustion gases 30 are split as they flow over the leading edge of the airfoil along both opposite sides thereof into the corresponding inter-airfoil flow passages. Horseshoe vortices are thusly created and decrease turbine efficiency.

As initially shown in FIG. 2, adjacent platforms 34 circumferentially or laterally adjoin each other at corresponding straight splitlines 52,54 having conventional spline seals (not shown) therebetween for maintaining a continuous circumferential inner flowpath boundary for the hot combustion gases. The first splitline edge 52 is disposed on the pressure side of the airfoil on the pressure side of the platform. And, the second splitline edge 54 is disposed on the suction side of the airfoil on the suction side of the platform.

In order to reduce the adverse affects of the horseshoe vortices, the outer surface of the platform 34 is specifically contoured in 3D radial elevation R from the axial centerline axis to include elevated ridges 56,58 and depressed troughs 60,62. This 3D endwall contouring (EWC) is determined by numerical flow analysis for the specific geometry of the turbine airfoil 32 in its operating environment in the turbofan engine for minimizing pressure losses due to the horseshoe vortices.

Figure 3:
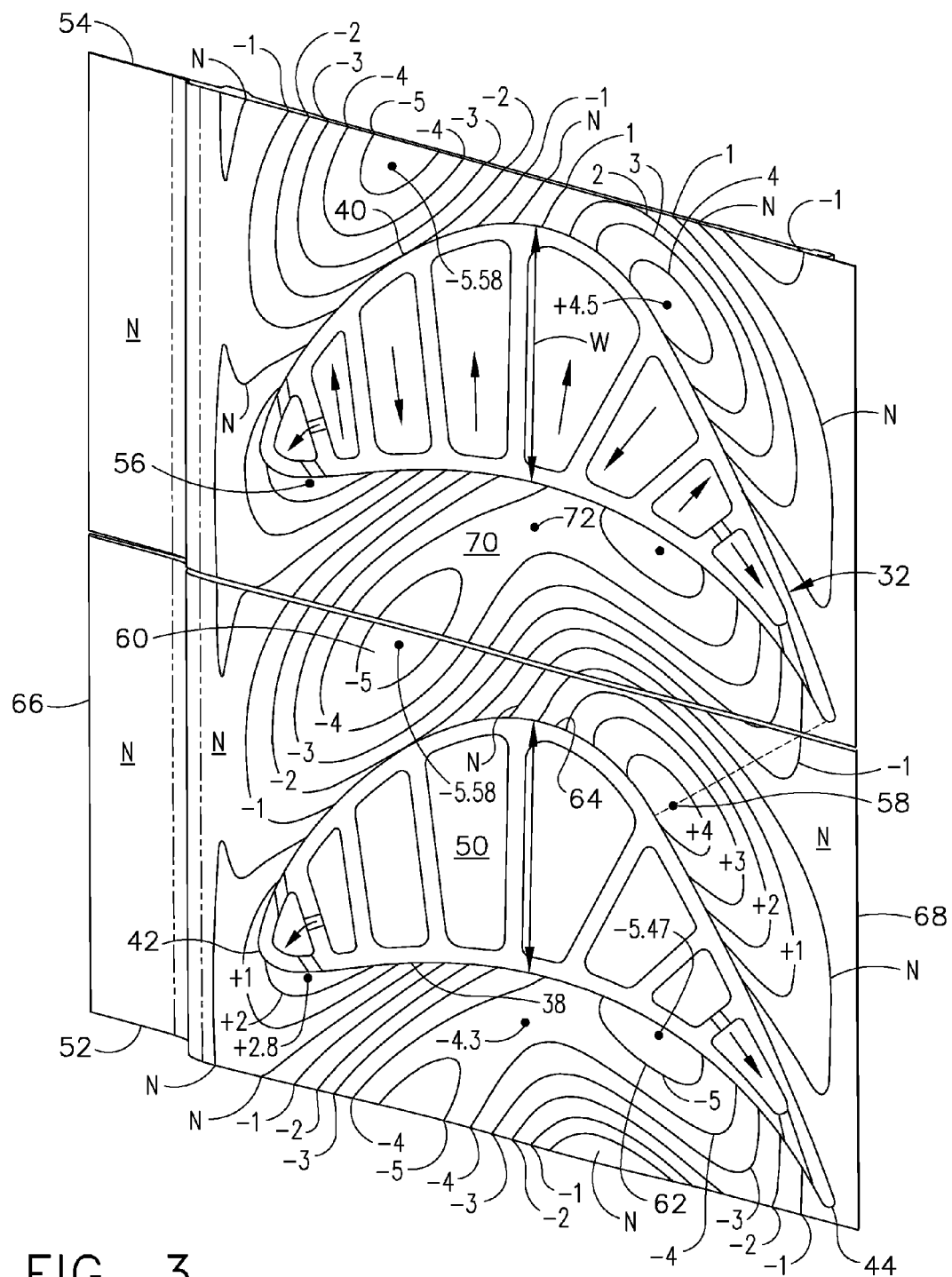
FIG. 3 is a planiform sectional view of the two rotor blades illustrated in FIG. 2 taken along line 3-3 with isoclines of common radial elevation and depression.
Figure 4:
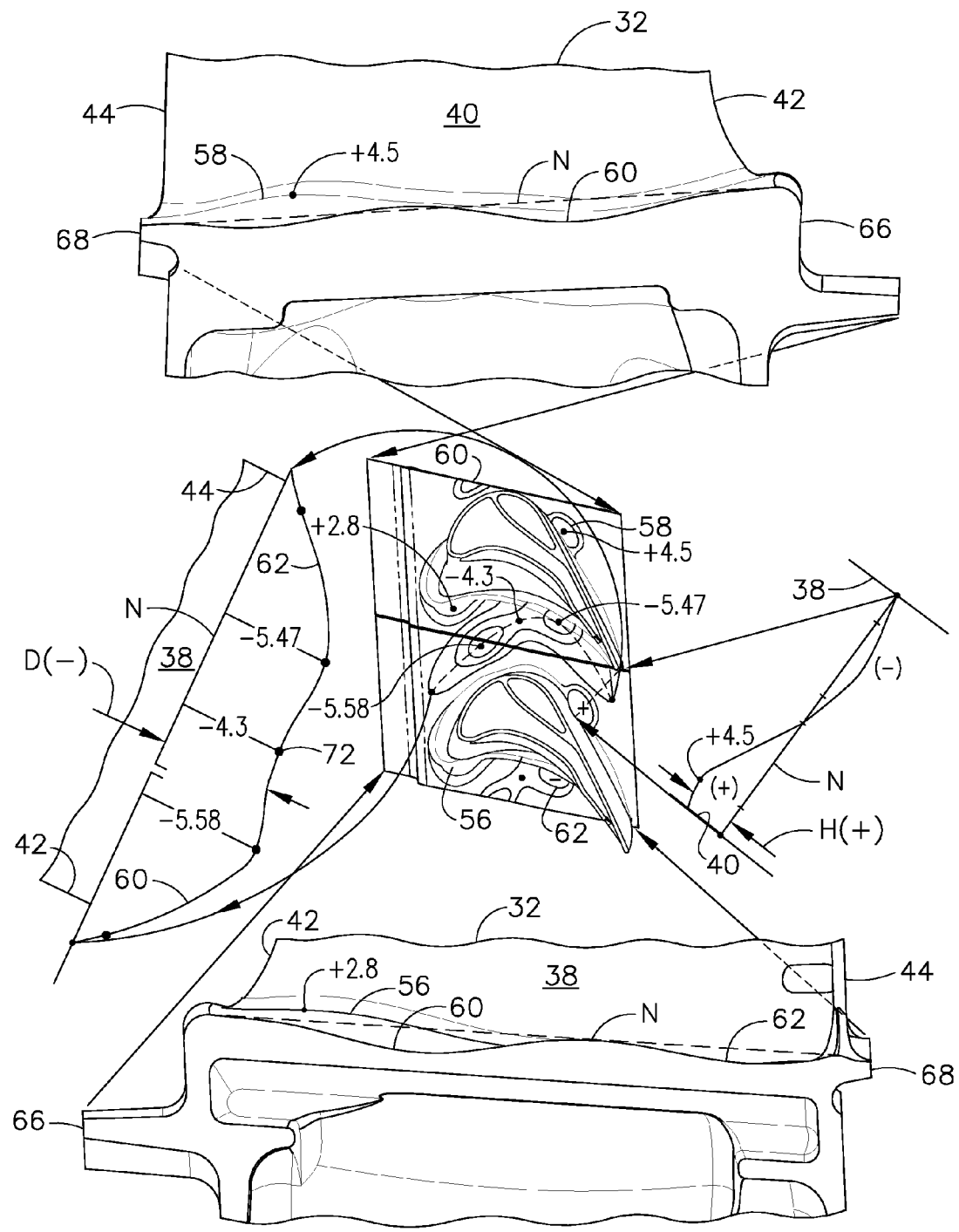
FIG. 4 is top planiform view of the blades shown in FIG. 2 taken along line 4-4 with representative transverse sections of the biformal platform contouring.

FIGS. 2-4 illustrate two circumferentially adjacent turbine airfoils 32 extending radially outwardly from atop their corresponding platforms 34. Isoclines of common radial elevation or height $H(+)$ and radial depression or depth $D(-)$ are shown relative to a nominal or reference elevation N which represents the axisymmetric or circular contour of a conventional turbine blade platform as measured at each axial plane.

The specific EWC of the platform 34 includes elevated or positive portions (+) and depressed or negative portions (−) determined by numerical flow analysis for maximizing turbine efficiency. The exemplary isoclines have normalized maximum and minimum values in height H and depth D relative to the reference land N, which has a zero value corresponding with conventional axisymmetric contours devoid of ridges and troughs.

In particular, each platform 34 is biformally contoured in radial elevation to include bilaterally disposed elevated ridges 56,58 and depressed troughs 60,62 on opposite sides of the airfoil, which ridges and troughs are complementary along the splitline edges 52,54 to uniformly repeat from platform to platform around the circumference of the blade row.

A forward ridge 56 extends laterally between the pressure side 38 and the splitline first edge 52.

An aft ridge 58 extends laterally between the suction side 40 and the splitline second edge 54.

A forward trough 60 also extends laterally between the suction side 40 and the splitline second edge 54.

And, an aft trough 62 extends laterally between the pressure side 38 and the splitline first edge 52.

The biformal platform 34 is specifically contoured in elevation to include the forward and aft elevated ridges 56,58 on opposite sides of the airfoil, and the forward and aft depressed troughs 60,62 also on opposite sides of the airfoil in bilateral cooperation to complement the EWC along the opposite pressure and suction sides.

Each platform has two opposite sides which adjoin each other in the circumferential middle of the inter-blade flow passages, and the pressure-side platform of one blade cooperates with the suction-side platform of the next blade to define the radially inner flowpath boundary between adjacent blades.

Accordingly, the biformal EWC of each blade platform is identical for the row of platforms, but must complement itself at each of the platform splitlines.

The airfoil 32 extends axially in chord between the axially opposite leading and trailing edges 42,44, and the forward ridge 56 and the forward trough 60 are disposed axially forward of the airfoil midchord, and the aft ridge 58 and the aft trough 62 are disposed axially aft of the midchord.

The specific airfoil illustrated in FIG. 3 has a hump 64 of maximum transverse or circumferential width W located quite near or at the midchord thereof which significantly affects its aerodynamic performance.

Correspondingly, the forward and aft ridges 56,58 and troughs 50,62 blend axially in common at the hump 64 on both sides of the airfoil.

Along the pressure side, the elevated forward ridge 56 blends axially with the depressed aft trough 62 between the leading and trailing edges 42,44 as the platform elevation correspondingly varies in height H(+) and varies in depth D(−) through the nominal zero elevation N therebetween.

Along the suction side, the depressed forward trough 60 blends axially with the elevated aft ridge 58 between the leading and trailing edges as the platform elevation correspondingly varies in depth D(−) and varies in height H(+) through the nominal zero elevation N therebetween.

Since the ridges and troughs have 3D surface coverage or area, they also blend around their respective perimeters including directly adjacent to the opposite pressure and suction sides of the airfoil at its root junction with the platform. Typically the airfoil root 46 comprises a small arcuate or concave fillet with the platform which is suitably sized to blend with the variation in height and depth of the adjoining ridges and troughs.

The platform 34 illustrated in FIG. 2 further includes axially opposite forward and aft ends 66,68 which may be conventional in configuration.

The forward end 66 extends forwardly from the airfoil leading edges 42 in a bullnose transition with a lower seal wing. And, the aft end 68 extends aft from the airfoil trailing edges 44 in a short cantilevered extension.

The forward ridge 56 and forward trough 60 blend in common elevation N along the platform forward end 66 before the airfoil leading edges and behind the bullnose, with that forward end being axisymmetrical with constant radius R at each axial plane.

The aft ridge 58 and aft trough 62 correspondingly blend in common elevation N with the platform aft end 68 behind the airfoil trailing edges, with that aft end being axisymmetrical with constant radius R at each axial plane.

Correspondingly, the ridges and troughs also blend with each other along the opposite splitline edges 52,54.

The forward ridge 56 and the aft trough 62 extend along the first splitline edge 52 and axially blend with each other in common elevation N near the leading edge 42, with the forward ridge blending in common elevation N with the platform forward end 66, and the aft trough blending in common elevation N with the platform aft end 68.

Correspondingly, the forward trough 60 and the aft ridge 58 extend along the second splitline edge 54 and axially blend with each other in common elevation N near the airfoil midchord or hump 64, with the forward trough blending in common elevation N with the platform forward end 66, and the aft ridge blending in common elevation N with the platform aft end 68.

The ridges 56,58 and troughs 60,62 extend along the corresponding splitline edges 52,54 to complement each other from platform to platform, and thusly repeat in half-patterns along the adjoining platforms, with the half-pattern along the splitline first edges 52 matching the opposite half-pattern along the second edges 54 in a combined full pattern bounding each inter-blade flow passage across the platform splitlines.

As shown in FIG. 3, the biformal EWC includes two distinct ridges 56,58 bilaterally disposed on opposite sides of the airfoil, as well as two distinct troughs 60,62 also disposed on opposite sides of the airfoil.

The aft trough 62 extends axially forwardly from the pressure side near the trailing edge 44 to the splitline first edge 52 near the leading edge 42 to complement the forward trough 60 along the splitline second edge 54.

The aft trough 62 joins the splitline first edge 52 in a commonly depressed saddle 70 rising laterally in depth or elevation to the forward ridge 56 on one side of the saddle and the splitline first edge 52 on the opposite side of the saddle.

The saddle 70 is a continuous depression having an arcuate or kidney shape being concave outwardly toward the first edge 52, and includes both the forward trough 60 from one platform and the aft trough 62 from the next platform bridging the common splitline.

As shown in FIGS. 3 and 4, the saddle also has a locally depressed middle peak 72 and increases in depth D therefrom aft along the aft trough 62 and forward to the splitline first edge 52.

Since the row of turbine blades adjoin circumferentially at the platforms, the saddle on one platform complements the forward trough on the next adjacent platform along the splitline edges. The saddle increases in depth D from its middle peak 72 both aft to a local maximum depth in the aft trough, and forward to another local maximum depth in the forward trough of the next adjacent platform.

Since the biformal EWC of the platform outer surface includes elevated ridges and depressed troughs, the radial elevation varies between local maximums and local minimums.

The forward and aft troughs 60,62 illustrated in FIGS. 3 and 4 are deeper in depth D(−) than the forward and aft ridges 56,58 are high in height H(+).

The aft ridge 58 has a relative maximum height H of +4.5 and is higher than the forward ridge 56 which has a smaller maximum height of +2.8.

The forward trough 60 has a maximum depth D of −5.58 and is slightly deeper than the aft trough 62 which has a maximum depth D of −5.47.

The forward and aft ridges 56,58 have maximum elevations or heights disposed similarly close and adjacent to the pressure and suction sides, respectively.

Correspondingly, the forward trough 60 has its maximum depth spaced laterally from the suction side 40 and located closely adjacent to the splitline second edge 54. The aft trough 62 has its maximum depth directly adjacent to the pressure side 38.

The maximum depths of the forward and aft troughs 60,62 are differently spaced from the suction and pressure sides, respectively, due to the different aerodynamic performance of those opposite airfoil sides. And, the different heights of the forward and aft ridges 56,58 are also effected by the different aerodynamic performance of the airfoil sides.

Computational flow analysis of the biformal EWC of the platforms 34 predicts improved aerodynamic performance and turbine efficiency by reducing strength of the horseshoe vortices and associated shear between the combustion gases and the platforms during operation.

Secondary flows are also decreased by reducing the static pressure gradient between adjacent airfoils in the inter-blade flow passages. Consistent with the decrease in secondary flows is a reduction in total pressure loss as well as the mitigation of the transfer of mass and momentum in the combustion gases from the predominate axially downstream direction to the radial direction.

And therefore, further improvements may be obtained by specifically modifying the airfoil tip 48. In particular, the tip 48 shown in FIG. 1 includes a pressure-side first rib 74 joined to a suction-side second rib 76 at the leading edge 42 and spaced transversely apart at the opposite trailing edge 44 to define an aft outlet 78.

A tip baffle 80 extends chordally between the ribs 74,76 to define a first pocket 82 along the first rib 74 laterally open at the aft outlet 78, and also defining a laterally closed second pocket 84 along the second rib 76.

The first and second squealer tip ribs 74,76 are radially integral extensions of the airfoil pressure and suction sides, or sidewalls, and conform in profile or curvature therewith. The airfoil tip includes a floor between the ribs 74,76 which bridges or spans the opposite sidewalls to enclose the internal cooling circuit 50.

The tip baffle 80 bifurcates the airfoil tip 48 between the bounding ribs 74,76 to define the first tip cavity or pocket 82 extending chordally along the first rib 74, and to also define the corresponding second tip cavity or pocket 84 extending chordally along the second rib 76.

The two ribs 74,76 are integrally joined together at the leading edge 42 of the airfoil, but are not joined together at the trailing edge 44, and instead are spaced transversely apart to define the aft outlet 78 for the first pocket 82.

Whereas the second pocket 84 is fully bound laterally by the tip baffle 80 and corresponding portion of the second rib 76, and is therefore laterally closed, the first pocket 82 is almost fully laterally bound by the first rib 74, tip baffle 80, and corresponding portions of the second rib 76, but is specifically open at its aft outlet 78.

Computational Fluid Dynamics (CFD) analysis has been performed on this exemplary tip embodiment to confirm performance improvements therefrom compared with a reference design having a single tip cavity without the bifurcating tip baffle therein.

The introduction of the tip baffle may be used in specific designs for improving turbine efficiency as well as reducing leakage of the combustion gases over the airfoil tip.

Turbine efficiency is based on the ability of the airfoil surfaces to extract energy from the differential pressure in the combustion gases acting over the pressure and suction sides of the airfoil from root to tip and between the leading and trailing edges. The introduction of the tip baffle provides additional surface area at the blade tip against which the tip flow may perform additional work on the blade. The tip baffle also provides an additional seal like the two squealer tip ribs themselves for reducing tip flow leakage.

Tip leakage includes both axial and circumferential components in view of the 3D configuration of the airfoil tip. The combustion gases 30 engage the airfoil around its leading edge both in axial and circumferential directions due to the oblique inlet angle from the upstream turbine nozzle 18.

It is desired to place the tip baffle 80 so that it captures incident flow streamlines over the forward portion of the second rib to funnel them inside the first tip pocket bounded by the tip baffle itself. The leakage gases are funneled through the first pocket in secondary flow fields that pressurize the first pocket while being guided aft along the tip baffle itself. The so pressurized first pocket increases turbine efficiency by extracting additional energy from the tip baffle itself, and also discourages further leakage over the tip gap by the increased pressure therein.

Correspondingly, some of the leakage gases captured by the first pocket will flow over the tip baffle into the second pocket and are further funneled in the aft direction therein. The leakage gases from both pockets will then be discharged in large part over the suction-side second rib in the downstream direction.

However, the introduction of the aft outlet 78 for the first pocket provides additional advantages, including the partial recovery of tip gases back to the inter-blade flow passages which terminate at the airfoil trailing edges. The aft outlet is located on the pressure side of the airfoil, and tip leakage recovered therethrough is returned to the flow passages upstream of the passage throats which are defined between the trailing edge normal to the suction side of the next adjacent airfoil.

The bifurcated airfoil tip may be used in combination with the biformal platform to collectively improve turbine efficiency, or they may be separately used as desired. Each provides an additional design feature for controlling the flowfield of the combustion gases as they flow downstream over the turbine blades from root to tip, and may be used to advantage to improve performance of turbine blades.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
   an airfoil joined to a platform along laterally opposite pressure and suction sides, with said platform having corresponding laterally opposite first and second splitline edges; and
   said platform is biformally contoured in elevation to include bilaterally disposed elevated ridges and depressed troughs on opposite sides of said airfoil being complementary along said splitline edges;
   wherein said airfoil extends axially in chord between opposite leading and trailing edges, and a forward ridge and a forward trough are disposed forward of the airfoil midchord, and an aft ridge and an aft trough are disposed aft of said midchord;
   said forward ridge extends laterally between said pressure side and said splitline first edge;
   said forward trough extends laterally between said suction side and said splitline second edge;
   said aft ridge extends laterally between said suction side and said splitline second edge;
   said aft trough extends laterally between said pressure side and said splitline first edge; and
   wherein said aft trough joins said splitline first edge in a commonly depressed saddle rising laterally in elevation to said forward ridge on one side and to said first splitline edge on an opposite side.

2. A blade according to claim 1 wherein:
   said forward ridge blends axially with said aft trough adjacent said pressure side; and
   said forward trough blends axially with said aft ridge adjacent said suction side.

3. A blade according to claim 2 wherein:
   said platform further comprises axially opposite forward and aft ends;
   said forward ridge and trough blend in common with said platform forward end before said leading edge; and
   said aft ridge and trough blend in common with said platform aft end behind said trailing edge.

4. A blade according to claim 3 wherein said forward and aft ridges have maximum heights adjacent said pressure and suction sides, respectively.

5. A blade according to claim 3 wherein said forward trough has a maximum depth spaced from said suction side, and said aft trough has a maximum depth adjacent said pressure side.

6. A blade according to claim 3 wherein said troughs are deeper than said ridges are high.

7. A row of turbine blades including at least first and second turbine blades according to claim 1 adjoining circumferentially at their respective first and second platforms wherein:
   said saddle on the first platform complements said forward trough on the second platform along said splitline edges; and
   said saddle has a locally depressed peak and increases in depth therefrom aft to a maximum depth in said aft trough, and forward to another maximum depth in said forward trough of the second platform.

8. A blade according to claim 1 further comprising an airfoil tip having a pressure-side first rib joined to a suction-side second rib at said leading edge and spaced transversely apart at said opposite trailing edge to define an aft outlet, and a tip baffle extends chordally between said ribs to define a first pocket along said first rib laterally open at said aft outlet, and also defining a laterally closed second pocket along said second rib.

9. A turbine blade comprising:
   an airfoil integrally joined to a platform along laterally opposite pressure and suction sides extending longitudinally in span from said platform and axially in chord between opposite leading and trailing edge; and
   said platform being biformally contoured in elevation to include forward and aft elevated ridges and complementary forward and aft depressed troughs along said opposite pressure and suction sides;
   wherein said forward and aft ridges are bilaterally disposed along said pressure and suction sides adjacent said leading edge and before said trailing edge, respectively; and said forward and aft troughs are bilaterally disposed along said suction and pressure sides behind said leading edge and before said trailing edge, respectively;
   wherein said platform has laterally opposite first and second splitline edges along said pressure and suction sides, respectively; and said forward ridge and aft trough extend along said first splitline edge to complement said forward trough and aft ridge extending along said second splitline edge;
   wherein said aft trough extends from said pressure side near said trailing edge to said splitline first edge near said leading edge to complement said forward trough along said splitline second edge; and
   wherein said aft trough joins said splitline first edge in a commonly depressed saddle rising laterally in elevation to said forward ridge on one side and said first splitline edge on an opposite side.

10. A blade according to claim 9 wherein:
    said forward ridge blends axially with said aft trough along said pressure side: and
    said forward trough blends axially with said aft ridge along said suction side.

11. A blade according to claim 10 wherein:
    said platform further comprises axially opposite forward and aft ends;
    said forward ridge and trough blend in common with said platform forward end before said leading edge; and
    said aft ridge and trough blend in common with said platform aft end behind said trailing edge.

12. A blade according to claim 10 wherein:
    said airfoil has a hump of maximum transverse width near the midchord thereof; and
    said forward and aft ridges and troughs blend axially in common at said hump.

13. A blade according to claim 10 wherein said troughs are deeper than said ridges are high.

14. A blade according to claim 10 wherein said aft ridge is higher than said forward ridge.

15. A blade according to claim 10 wherein said forward trough is deeper than said aft trough.

16. A blade according to claim 10 wherein said forward and aft ridges have maximum heights disposed similarly close to said pressure and suction sides, respectively.

17. A blade according to claim 10 wherein said forward and aft troughs have maximum depths differently spaced from said suction and pressure sides, respectively.

18. A blade according to claim 9 wherein said saddle has a locally depressed peak and increases in depth therefrom aft along said aft trough and forward to said splitline first edge.

19. A blade according to claim 9 further comprising an airfoil tip having a pressure-side first rib joined to a suction-side second rib at said leading edge and spaced transversely apart at said opposite trailing edge to define an aft outlet, and a tip baffle extends chordally between said ribs to define a first pocket along said first rib laterally open at said aft outlet, and also defining a laterally closed second pocket along-said second rib.

* * * * *